(12) United States Patent
Cawood et al.

(10) Patent No.: US 9,812,794 B2
(45) Date of Patent: Nov. 7, 2017

(54) STAMPED HOTLINE CLAMP

(71) Applicant: Thomas & Betts International LLC, Wilmington, DE (US)

(72) Inventors: Matthew D. Cawood, Deleon Springs, FL (US); James L. Zahnen, Ormond Beach, FL (US); Ronald Vallette, Ormond Beach, FL (US); Jacob Serre, Daytona Beach, FL (US)

(73) Assignee: THOMAS & BETTS INTERNATIONAL LLC, Wilmington, DE (US)

( * ) Notice: Subject to any disclaimer, the term of this patent is extended or adjusted under 35 U.S.C. 154(b) by 0 days.

(21) Appl. No.: 15/177,946

(22) Filed: Jun. 9, 2016

(65) Prior Publication Data

US 2016/0365650 A1    Dec. 15, 2016

Related U.S. Application Data

(60) Provisional application No. 62/173,584, filed on Jun. 10, 2015.

(51) Int. Cl.
| | |
|---|---|
| *H01R 13/00* | (2006.01) |
| *H01R 4/40* | (2006.01) |
| *H01R 4/42* | (2006.01) |
| *H02G 1/02* | (2006.01) |
| *H01R 43/16* | (2006.01) |
| *H02G 7/00* | (2006.01) |

(52) U.S. Cl.
CPC ............. *H01R 4/40* (2013.01); *H01R 4/42* (2013.01); *H02G 1/02* (2013.01); *H01R 43/16* (2013.01); *H02G 7/00* (2013.01)

(58) Field of Classification Search
CPC .......... H01R 4/64; H01R 11/14; H01R 11/15; H01R 4/38; G01R 1/067
USPC ........................... 439/92, 477–480, 803, 815
See application file for complete search history.

(56) References Cited

U.S. PATENT DOCUMENTS

| | | | | |
|---|---|---|---|---|
| 2,397,390 | A | | 3/1946 | Wadsworth |
| 2,462,247 | A | * | 2/1949 | Wright ................... H01R 11/14 174/160 |
| 2,514,474 | A | | 7/1950 | Cook |
| 2,555,099 | A | * | 5/1951 | Lucian ................... H01R 11/15 439/815 |
| 2,574,746 | A | | 11/1951 | Luther |
| 2,574,796 | A | * | 11/1951 | Moore ................... H01R 11/15 411/955 |

(Continued)

*Primary Examiner* — Thanh Tam Le
(74) *Attorney, Agent, or Firm* — Hoffmann & Baron, LLP

(57) ABSTRACT

A stamped hotline clamp having two parallel top side walls, two parallel bottom side walls, a hinge pin, a conductor plate, a saddle and an elongated metal shaft. The hinge pin pivotably connects the top side walls to the bottom side walls on one end. At the other end, a standoff separates and connects the top side walls and a contact plate connects the bottom side walls. The bottom side walls pivotably contact the saddle. The conductor plate extends between the top side walls and pivotably contacts the contact plate when the clamp is closed. The top end of the shaft is inserted through an opening in the saddle and threaded into an aperture in the conductor plate. Rotating the shaft in a clockwise direction closes the clamp and rotating the bottom end of the shaft in a counter-clockwise direction opens the clamp.

23 Claims, 10 Drawing Sheets

(56) References Cited

U.S. PATENT DOCUMENTS

| | | | | |
|---|---|---|---|---|
| 2,582,267 | A | * | 1/1952 | Moore .................. H01R 11/14 24/122.6 |
| 2,651,766 | A | | 9/1953 | Runde |
| 2,811,703 | A | | 10/1957 | Becker |
| 2,958,067 | A | | 10/1960 | Hardy |
| 3,036,286 | A | | 5/1962 | Gorc et al. |
| 3,075,166 | A | | 1/1963 | Peek |
| 3,132,914 | A | | 5/1964 | Wengen |
| 3,142,525 | A | | 7/1964 | Roosman |
| 3,923,263 | A | | 12/1975 | Abbott |
| 4,136,423 | A | | 1/1979 | Sterling |
| 4,646,395 | A | | 3/1987 | Mayszak |
| 4,707,051 | A | | 11/1987 | Hall |
| 4,795,377 | A | | 1/1989 | Schmode et al. |
| 4,846,725 | A | | 7/1989 | Williams et al. |
| 5,547,404 | A | | 8/1996 | Nellis, Jr. et al. |
| 5,556,299 | A | | 9/1996 | Finke |
| 5,624,286 | A | | 4/1997 | Marco |
| 5,704,816 | A | * | 1/1998 | Polidori ................... H01R 4/44 403/391 |
| 5,746,609 | A | * | 5/1998 | Franks, Jr. ............... H01R 4/66 439/443 |
| 5,928,006 | A | * | 7/1999 | Franks, Jr. ............... H01R 4/36 439/443 |
| 6,533,605 | B1 | | 3/2003 | Reuter |
| 7,029,316 | B2 | | 4/2006 | Jackson, III |
| 7,156,692 | B2 | | 1/2007 | Jackson, III |
| 7,666,024 | B2 | * | 2/2010 | De France ........... H01R 4/4872 439/479 |
| 7,993,169 | B1 | | 8/2011 | Hoxha |
| 8,152,575 | B2 | | 4/2012 | Boling et al. |
| 8,512,070 | B2 | | 8/2013 | De France |
| 8,651,891 | B2 | | 2/2014 | Balfour et al. |

* cited by examiner

STAMPED HOTLINE CLAMP

This application claims priority from provisional application Ser. No. 62/173,584, filed on Jun. 10, 2015, which is incorporated herein in its entirety.

FIELD OF THE INVENTION

The present invention is a hotline clamp. In particular, the present invention relates to a hotline clamp formed from a plurality of stamped components.

BACKGROUND OF INVENTION

Hot line clamps, also referred to as tap off connectors, are designed to connect and disconnect the conductor link between the main line and a transformer or to jump the line. The clamps are typically made of a bronze or aluminum alloy body and are installable manually or with a standard wrench. Hot line clamps are typically employed in overhead line operations at significant heights above the ground and require rotation from below by a fiberglass hot stick that is typically several feet long. The hot stick is manipulated by the lineman from an elevated bucket at a distance from the hot line clamp installation. These connectors can be constructed from castings or extrusions. These processes and/or materials result in added materials or a slow inefficient process, which result in additional costs. Some designs use stamped and metal injection molded components to optimize process and material costs.

The traditional methods used to manufacture hotline clamps employ castings, which are expensive, have low conductivity and are prone to quality issues. Accordingly, there is a need for a hotline clamp that is less expensive, has a higher conductivity and a more durable construction.

SUMMARY OF THE INVENTION

In accordance with the present invention, a stamped hotline clamp is provided. The stamped hotline clamp comprising, consisting of or consisting essentially of two parallel, opposing top side walls; two parallel, opposing bottom side walls; a conductor plate; a saddle; a hinge; a standoff; and an elongated shaft. Each of the two parallel, opposing top side walls has a plurality of apertures, a retainer extending towards the opposing top side wall, first and second ends that define a length, top and bottom edges that define a width and an intermediate section between the first and second ends. The width of the first end is greater than the width of the second end and the bottom edge of the intermediate section is concave and has a recessed portion or notch.

Each of the two parallel, opposing bottom side walls has an aperture, first and second ends, top and bottom edges and upper and lower sections separated by a curved slot. The first and second ends correspond to the first and second ends of the top side walls and the first and second bottom side walls are connected by a base plate at the second end and a contact plate that extends from the base plate to an intermediate point on the top edges of the bottom side walls. The curved slots extend from the first end of each of the bottom side walls towards the second ends and have first and second sides that correspond with the top and bottom edges of the side walls. Preferably, the slot is perpendicular to the base plate between the second end of the bottom side walls to an intermediate point and then curves upwardly between the intermediate point and the first end.

The conductor plate is disposed between the top side walls and has a longitudinal axis parallel to the top side walls and extending between first and second ends. The first end that is rolled over to form a cylindrical or figure-8 shape and second end is concave in a downward direction. An intermediate section connects the first and second ends. The cylindrical first end is transverse to the longitudinal axis and has first and second ends and an intermediate aperture for connecting a jumper line to the clamp. The downwardly concave second end forms a cable seat and the intermediate section has a threaded aperture and side edges that are supported by the retainers on the top side walls. The concave second end extends parallel to the cylindrical first end and has first and second distal ends that are received by the recessed portion or notch in each of the top side walls.

The saddle includes a rectangular flat base having an opening, first and second ends, first and second sides and top and bottom surfaces. A guide wing can extend upwardly and inwardly from each of the first and second ends and two legs can extend downwardly from each of the sides. The second end of the saddle slides into the slots in the two bottom side walls with the base extending through the slots and the two legs of the saddle extending downwardly on the outside of the bottom side walls.

A hinge extends through apertures in the top and bottom side walls and pivotably connects the first ends of the top side walls and the bottom side walls. One or more standoffs can separate and connect the parallel top side walls at the second ends. The elongated shaft includes a threaded first end, a second end and a flanged collar radially extending from the shaft at a point between the first and second ends; preferably, the second end is formed by a ring.

To assemble the clamp, the first end of the shaft is inserted into the opening in the saddle and the bottom surface of the saddle contacts the flanged collar. The first end of the shaft is then threaded into the threaded aperture in the conductor plate. Rotating the shaft in a clockwise direction closes the clamp and rotating the shaft in a counter-clockwise direction opens the clamp. When the clamp opens and closes, the top sides of the curved slots in the bottom side walls pivot on the base of the saddle to move the contact plate towards the cable seat of the conductor plate.

BRIEF DESCRIPTION OF THE FIGURES

The preferred embodiments of the stamped hotline clamp of the present invention, as well as other objects, features and advantages of this invention, will be apparent from the accompanying drawings wherein.

DETAILED DESCRIPTION OF THE INVENTION

Figure 1:
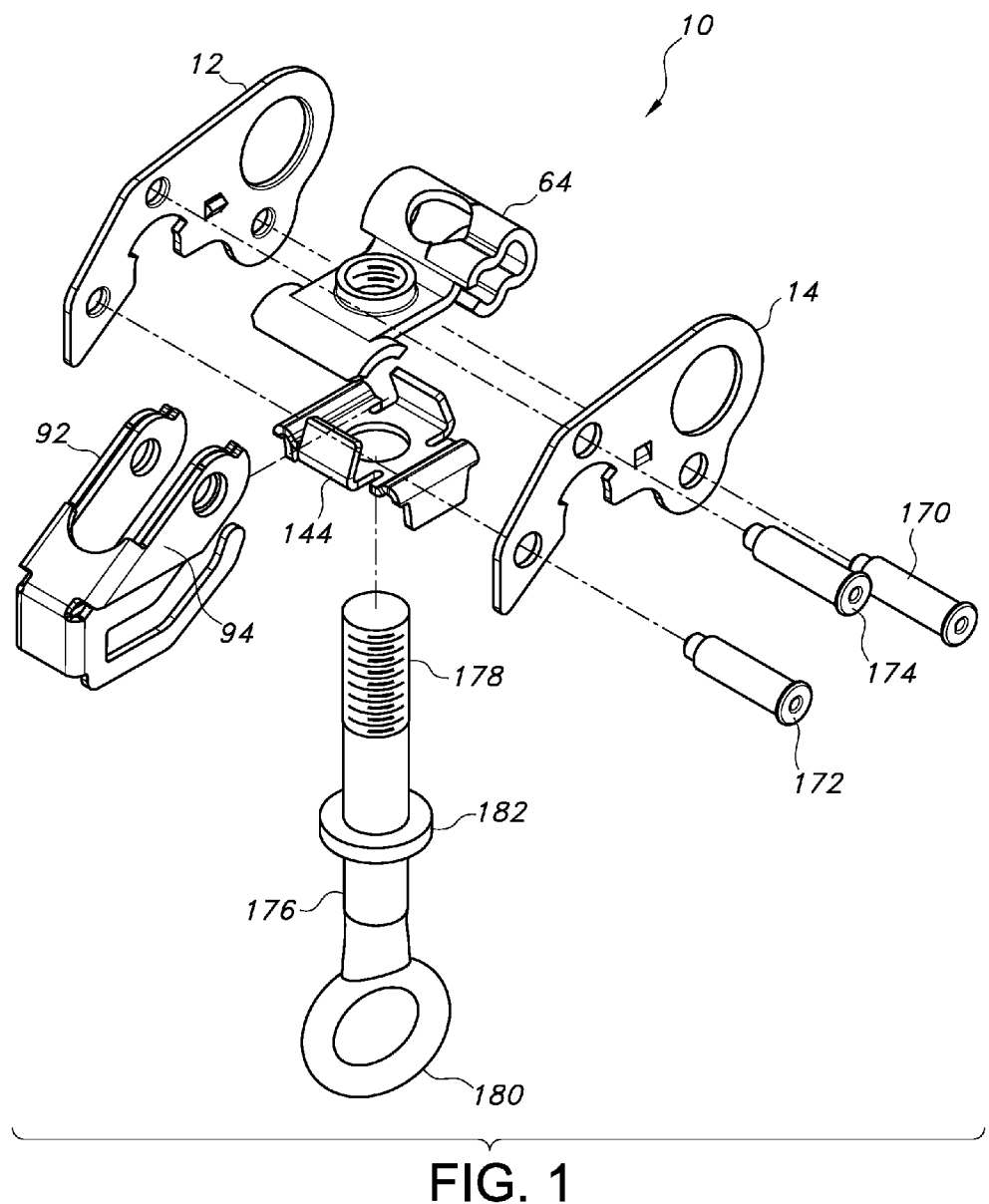
FIG. 1 is an exploded view of a preferred embodiment of the stamped hotline clamp.

The present invention is a stamped hotline clamp that is used to connect and disconnect a conductor link between a main line and a transformer or to jump the line. The base construction uses two stamped side plates, a stamped jaw to create the body and a metal-insulator-metal ("MIM") stamped or extruded contact to connect the main conductor to the tap. The stamped pieces can be constructed of carbon or stainless steel, aluminum or a composite metal and the contact is a conductive metal, preferably high conductivity copper.

The present invention uses stamped components to replace the castings used in the prior art. The use of stamped components provides the following advantages: significantly reduces the amount of material required; eliminates threading operations by using standard mass produced hardware; allows the use of high conductivity materials; allows the use of alternative materials like copper clad aluminum or copper clad stainless steel; and allows the use of high volume stamping operations (e.g., progressive stamping and four slide).

As used herein, the term "metal stamping" refers to the process of creating and forming thin-walled metal pieces from sheet metal. This is done by placing flat sheet metal in either blank or coil form into a stamping press where punches and dies form the metal into a net shape. The punches and dies are mounted on mechanical or hydraulic presses and they perform two functions during the stamping process: shearing and bending. A stamping operation can be done at either a single die station or multiple die stations using progressive dies. Progressive dies are typically used when the part contains closely spaced features or if they have a bend angle greater than 90 degrees.

In one embodiment, the stamped hotline clamp includes two parallel top side walls, two parallel bottom side walls, a hinge pin, a conductor plate, a saddle and an elongated metal shaft. The clamp can also include one or more standoffs separating the top side walls. The top side walls are substantially flat and parallel and have first and second ends, top and bottom edges, one or more apertures and retainers extending from the inside surfaces, wherein each bottom edge has an intermediate concave section.

The bottom side walls are substantially flat and parallel and have first and second ends and top and bottom edges that correspond to the first and second ends and top and bottom edges of the top side walls. The second ends of the bottom side walls are connected to a base plate and the slots extend from the first ends towards the base plate. A contact plate extends from the base plate along the top edges of the bottom side walls. The slots have top and bottom sides that correspond to the top and bottom edges of the bottom side walls. The top sides of the slots are curved to allow the bottom side walls to pivot. The bottom side walls extend upwardly and away from the base plate at an angle of between 30 and 60 degrees, preferably about 45 degrees. The proximal end of the slots extend perpendicular to the base plate and then upwardly parallel to the top edge of the bottom side walls.

The conductor plate has first and second ends that correspond to the first and second ends of the top and bottom side walls. The first end of the conductor plate is folded over into an irregularly shaped cylinder or figure-8 configuration and the second end curves downwardly to form a seat for receiving a cable. An intermediate section connects the first and second ends and is substantially flat with a threaded aperture. The top surface of the intermediate section around the threaded aperture can be "built up" to form a hub so that additional threads can be added to the threaded aperture. The irregularly shaped cylinder on the first end of the conductor plate has opposing ends that are compression fit or snap fit into apertures at the first ends of the pair of top side walls. The retainers on the inside walls of the pair of top side walls support the intermediate section of the conductor plate. The opposing sides of the seat on the second end of the conductor plate extend outwardly and are engaged by the recessed portion or notch in the intermediate concave sections of the top side walls.

The saddle has a rectangular flat base with first and second ends, first and second sides, an opening in the middle and top and bottom surfaces. Two guide wings extend upwardly and, preferably, inwardly from the two ends and two legs extend downwardly from the two sides. The guide wing end of the saddle slides into the slots in the two bottom side walls with the base extending through the slots and the two legs of the saddle extending downwardly on the outside of the bottom side walls.

After the conductor plate is attached to the top side walls and the saddle is positioned in the slot of the bottom side walls, the hinge pin passes through apertures in the first ends of the top and bottom side walls to pivotably connect the top and bottom side walls. The one or more standoffs are attached between the pair of top side walls through apertures at the second ends either before or after the hinge pin is connected to separate and connect the top side walls.

The elongated metal shaft has a ring on the first end, a threaded second end and a flanged collar radially extending from the shaft intermediate the first and second ends. The first end of the shaft is inserted through the opening in the saddle and the bottom side of the saddle rests on the flanged collar. The top end of the shaft is then threaded into the threaded aperture in the conductor plate. Rotating the shaft in a clockwise direction closes the clamp and rotating the bottom end of the shaft in a counter-clockwise direction opens the clamp. As the clamp opens and closes, the top sides of the slots pivot on the base of the saddle to bring the contact plate on the bottom side walls in contact with the cable seat of the conductor plate.

Another embodiment is a method of making a stamped hotline clamp. The method comprising, consisting of or consisting essentially of: (1) metal stamping a pair of substantially flat, parallel top side walls having first and second ends and top and bottom edges, wherein each of the bottom edges has an intermediate concave section, each of the first ends has a first aperture and a first opening and each of the second ends has two apertures; (2) metal stamping a pair of substantially flat, parallel bottom side walls having first and second ends corresponding to the first and second ends of the top side walls, wherein each of the first ends has a first aperture a slot and the second ends of the bottom side walls are connected to a base plate and a contact plate; (3) pivotably connecting the pair of parallel top side walls and the pair of parallel bottom side walls at the first ends with a hinge pin that passes through each of the first apertures of the top side walls and each of the first apertures of the bottom side walls; (4) separating and connecting the pair of top side walls at the second ends with a standoff passing through each of the second apertures of the top side walls; (5) positioning a conductor plate between the pair of top side walls parallel to the hinge pin on the first end, wherein the conductor has a cylindrically-shaped first end and a downwardly concave second end that are connected by an intermediate section with a threaded aperture, wherein the opposing ends of the cylindrically-shaped first end are positioned in the first openings of the top side walls; (6) connecting the pair of bottom side walls at the second ends with a base plate attached to a contact plate on the top edges of the bottom side walls; (7) forming a saddle having a flat base with an opening, first and second ends with upwardly extending guide wings and first and second sides with downwardly extending legs; (8) inserting one of the ends of the saddle between the bottom side walls so that the sides pass through the slots and the legs extend outside the bottom side walls; (9) inserting an elongated metal shaft having a flanged collar radially extending from the shaft and located intermediate the first and second ends, a ring-shaped bottom end and a threaded top end sequentially through the opening in the saddle and into the threaded aperture in the conductor plate. Rotating the shaft in a clockwise direction closes the clamp and the conductor plate moves towards the contact plate to secure an electrical conductor. Rotating the bottom end of the shaft in a counter-clockwise direction opens the clamp.

Referring now to the drawings, FIG. 1 shows an exploded view of a preferred embodiment of the stamped hotline clamp 10. The clamp 10 has two parallel, opposing top side walls 12, 14, a conductor plate 64, two parallel, opposing bottom side walls 92, 94, a saddle 144, a hinge 170, two standoffs 172, 174 and an elongated shaft 176.

Figure 2:
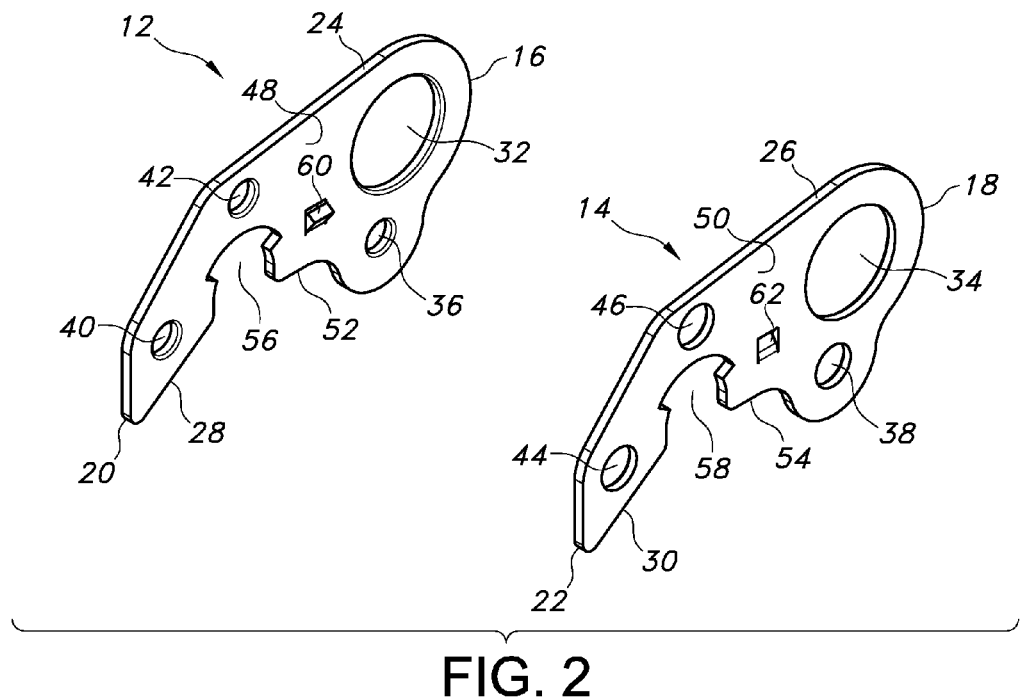
FIG. 2 is a perspective view of the top side walls of the stamped hotline clamp shown in FIG. 1.

As shown in FIG. 2, each of the two parallel top side walls 12, 14 has a first end 16, 18, a second end 20, 22, a top edge 24, 26 and a bottom edge 28, 30. A large aperture 32, 34 is located near the first end 16, 18 of each top side walls 12, 14 above a smaller aperture 36, 38. Two additional apertures 40, 42 and 44, 46 are located near the second end 20, 22 of each of the top side walls 12, 14. The top side walls 12, 14 also have an intermediate section 48, 50 with a concave bottom edge 52, 54 and a recessed portion or notch 56, 58. A retainer 60, 62 extends from the intermediate section 48, 50 of each top side wall 12, 14 towards the opposing top side wall 12, 14.

Figure 3:
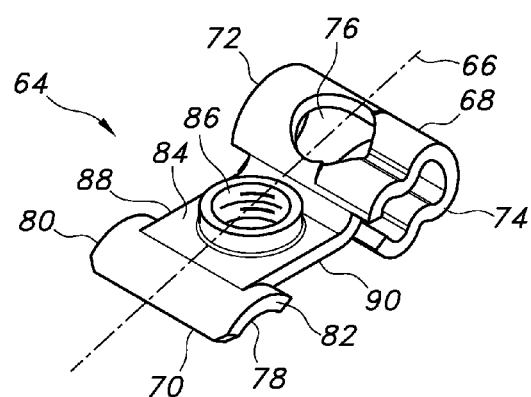
FIG. 3 is a perspective view of the conductor plate of the stamped hotline clamp shown in FIG. 1.

FIG. 3 shows the conductor plate 64 that is disposed between the two top side walls 12, 14. The conductor plate 64 has a longitudinal axis 66 extending between a cylindrical first end 68 and a downwardly concave second end 70. The cylindrical first end 68 is bent over into a compressible cylindrical or figure-8 shape (for the purposes of this disclosure, a cylindrical shape and figure-8 shape are considered to be the same) that extends transverse to the longitudinal axis 66. The cylindrical first end 68 has first and second ends 72, 74 and an aperture 76. The downwardly concave second end 70 extends parallel to the cylindrical first end 68 and forms a cable seat 78 for receiving a cable. The downwardly concave second end 70 has first and second ends 80, 82 that correspond to the first and second ends 72, 74 of the cylindrical first end 68. An intermediate section 84 connects the cylindrical first end 68 and the downwardly concave second end 70. The intermediate section 84 has a threaded aperture 86 and opposing side edges 88, 90.

Figures 4A, 4B:
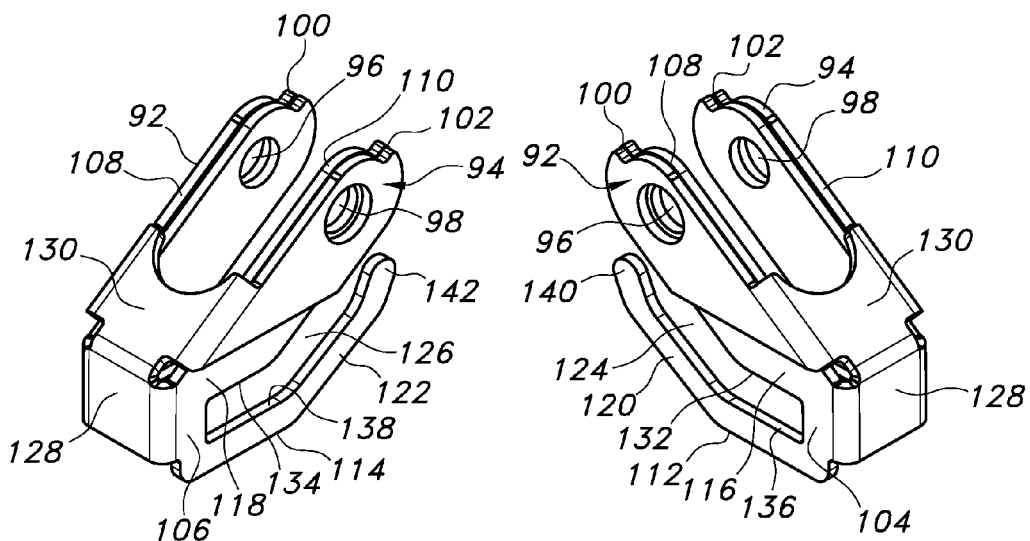
FIGS. 4A and B are perspective views of the two sides of the bottom side walls of the stamped hotline clamp shown in FIG. 1.

FIGS. 4A and 4B show the two sides of the two parallel bottom side walls 92, 94. Each of the bottom side walls 92, 94 has an aperture 96, 98, a first end 100, 102, a second end 104, 106, a top edge 108, 110, a bottom edge 112, 114 and an upper section 116, 118 and a lower section 120, 122 separated by a curved slot 124, 126. The first and second bottom side walls 92, 94 are connected by a base plate 128 at the second ends 104, 106 and a contact plate 130 that extends from the base plate 128 to an intermediate point on the top edges 108, 110 of the bottom side walls 92, 94. Each curved slot 124, 126 extends from the first end 100, 102 of the bottom side wall 92, 94 towards the second end 104, 106. The curved slots 124, 126 each have a first side 132, 134 and a second side 136, 138 that correspond with the top edges 108, 110 and bottom edges 112, 114, respectively, of the side walls 92, 94. The curved slot 124, 126 is perpendicular to the base plate 128 between the second end 104, 106 of the bottom side walls 92, 94 and an intermediate point and then curves upwardly between the intermediate point and the first end 100, 102. The distal ends 140, 142 of the lower sections 120, 122 turn upwardly and act as a limit stop.

Figure 5:
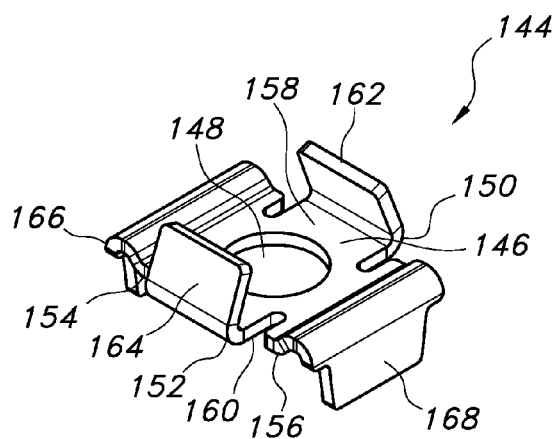
FIG. 5 is a perspective view of the saddle of the stamped hotline clamp shown in FIG. 1.

FIG. 5 shows the saddle 144 and it includes a rectangular flat base 146 having an opening 148, a first end 150, a second end 152, a first side 154, a second side 156, a top surface 158 and a bottom surface 160. Guide wings 162, 164 extend upwardly and inwardly from the first and second ends 150, 152 and legs 166, 168 extend downwardly from each of the sides 154, 156.

As shown in FIG. 1, the hinge 170 extends through the apertures 36, 38 in the top side walls 12, 14 and the apertures 96, 98 in the bottom side walls 92, 94 to pivotably connect the first ends 16, 18 of the top side walls 12, 14 and the first ends 100, 102 of the bottom side walls 92, 94. Preferably, the hinge 170 freely passes through the aperture 38 in the second top side wall 14 and the apertures 96, 98 in the bottom side walls 92, 94 and is press-fit into the aperture 36 in the first top side wall 12 or attached with a rivet-type connector.

FIG. 1 also shows two standoffs 172, 174 that can be used to separate and connect the parallel top side walls 12, 14 at the second ends 20, 22. The standoffs 172, 174 first pass through apertures 44, 46 in the second top side wall 14 and then through apertures 40, 42 in the first top side wall 12. The standoffs 172, 174 prevent the first ends 20, 22 of the top side walls 12, 14 from buckling when the clamp 10 is closed.

As shown in FIG. 1, the elongated shaft 176 has a threaded first end 178, a second end 180 with a ring and a flanged collar 182 radially extending from the shaft 176 at a point between the first and second ends 178, 180. After the other components of the clamp 10 are assembled, the elongated shaft 176 is inserted through the opening 148 in the saddle 144 and threaded into the threaded aperture 86 in the conductor plate 64.

Figure 6:
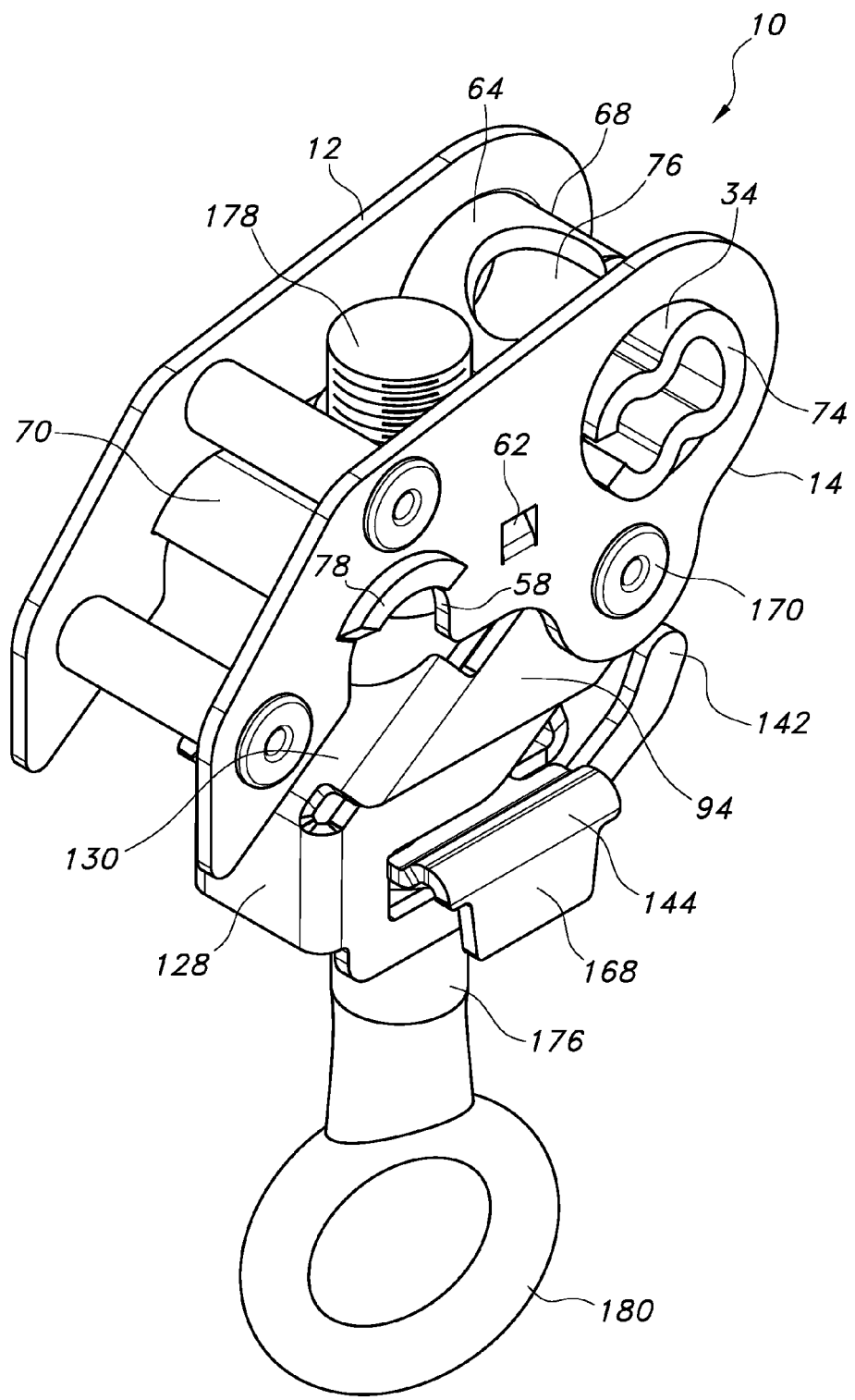
FIG. 6 is a front-side perspective view of the assembled stamped hotline clamp shown in FIG. 1.

FIG. 6 shows an assembled stamped hotline clamp 10 in the open position. The opening between the cable seat 78 and the contact plate 130 is placed over a high voltage electrical power line and the ring 180 on the second end of the elongated shaft 176 is rotated clockwise to close the clamp 10. FIG. 6 also shows the second end 74 of the cylindrical end 68 of the conductor plate 64 is compression fit or press fit into the large aperture 34 in the top side wall 14. The concave second end 70 of the conductor plate 64 has a second end 82 that extends through the notch 58 in the top side wall 14. The retainer 62 on the inside of top side wall 14 supports the conductor plate 64. The hinge pin 170 pivotably connects the top side walls 12, 14 and the bottom side walls 92, 94.

Figure 7:
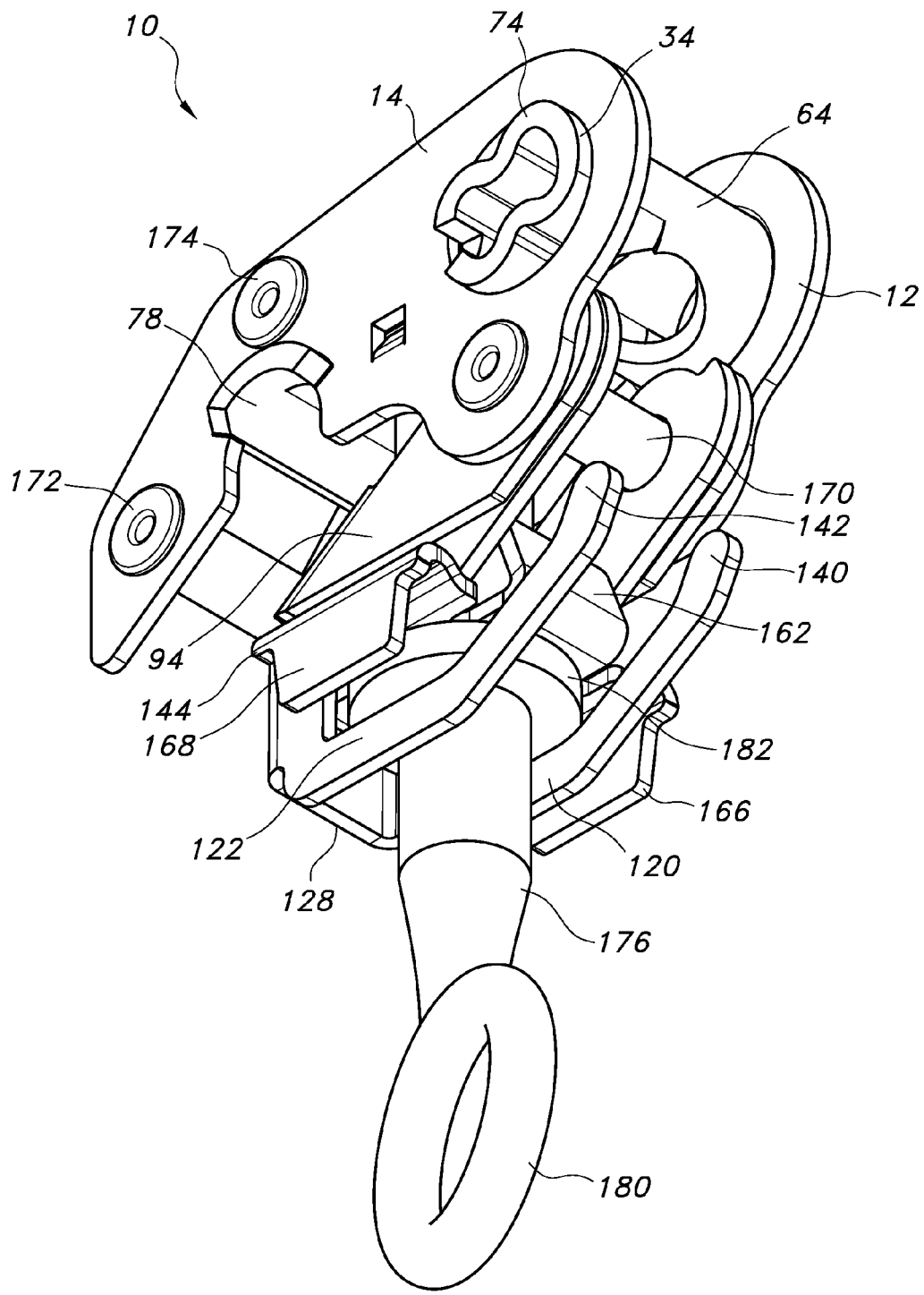
FIG. 7 is a rear-side perspective view of the stamped hotline clamp shown in FIG. 6.

FIG. 7 shows the rear of the stamped hotline clamp 10 in the open position. The saddle 144 is on top of the collar 182 of the elongated shaft 176 and the guide wings 162, 164 of the saddle 144 are disposed between the two bottom side walls 92, 94 to keep the bottom side walls 92, 94 aligned as the clamp 10 is opened and closed. The distal ends 140, 142 of the lower sections 120, 122 of the bottom side walls 92, 94 act as a limit stops and prevent the clamp 10 from being over-tightened.

Figure 8:
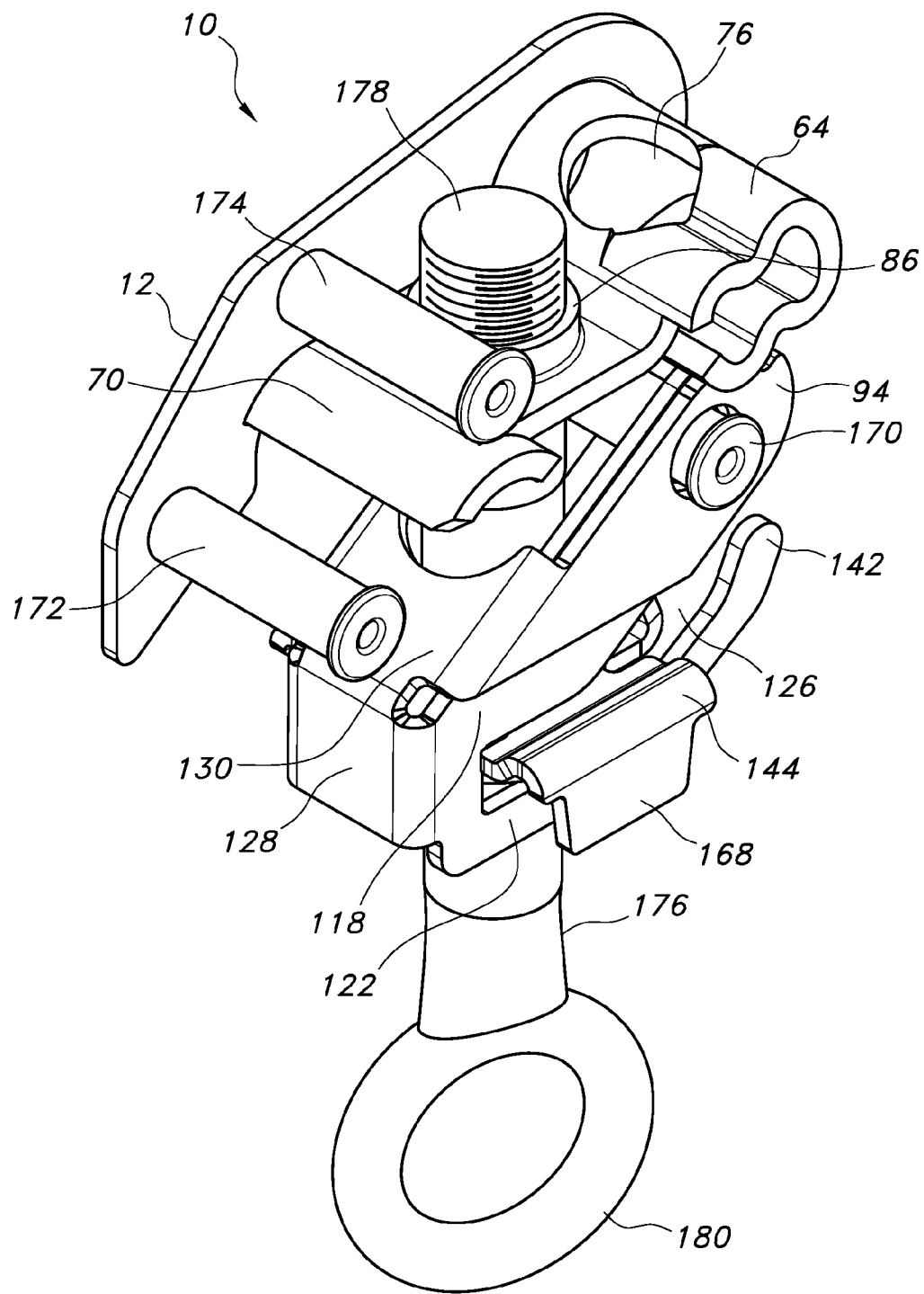
FIG. 8 is a front-side perspective view of the stamped hotline clamp shown in FIG. 6 in the open position with one of the top side walls removed.

FIG. 8 shows the stamped hotline clamp 10 with the second top side wall 14 removed and illustrates how the two legs 166, 168 of the saddle 144 extend through the curved slots 124, 126 in the bottom side walls 92, 94 and extend downwardly to keep the clamp 10 aligned. When the elongated shaft 176 is rotated clockwise, the threaded first end 178 passes through the threaded aperture 86 in the conductor plate 64 to close the clamp 10.

Figure 9:
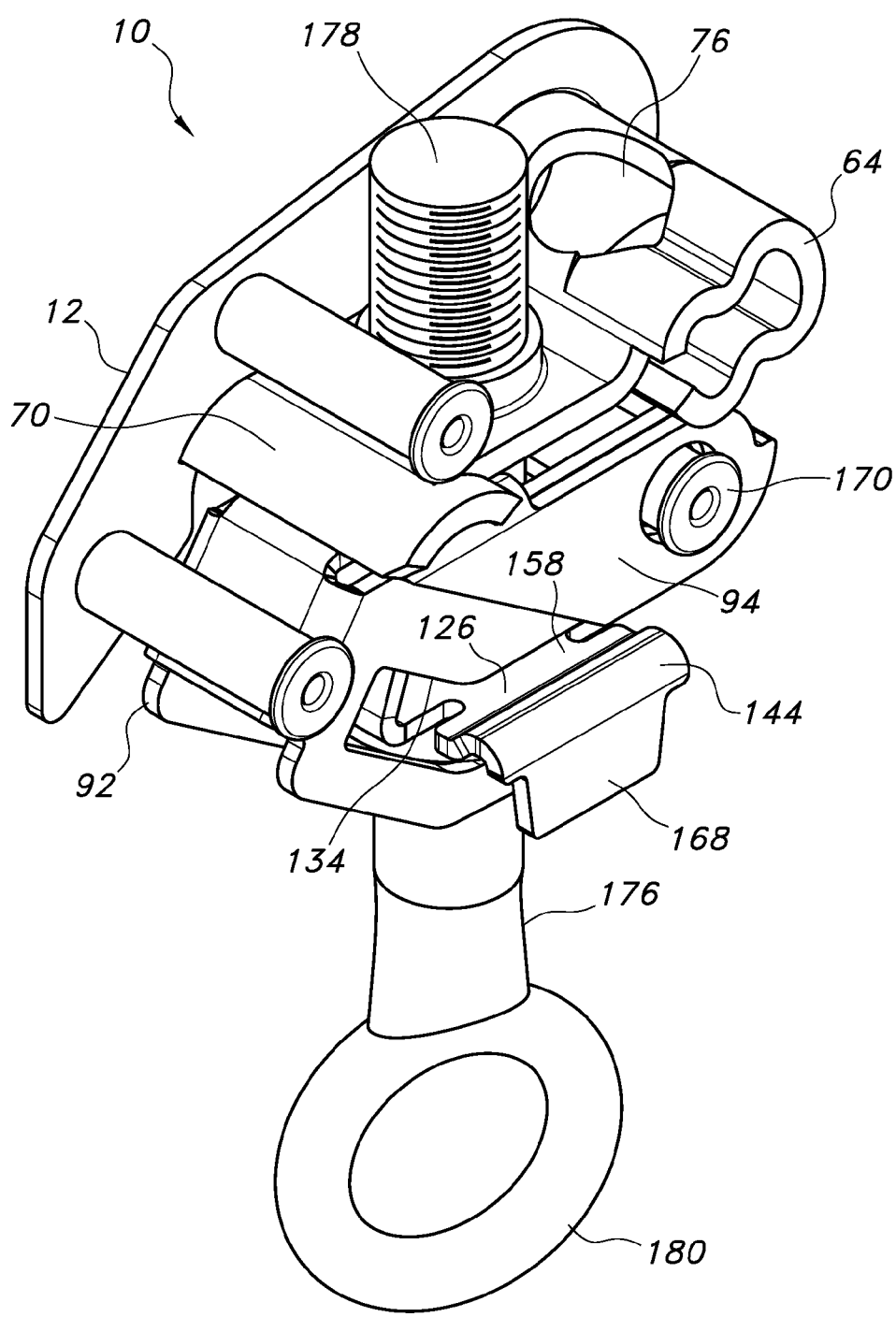
FIG. 9 is a front-side perspective view of the stamped hotline clamp shown in FIG. 6 in the closed position with one of the top side walls removed.

FIG. 9 shows the stamped hotline clamp 10 in a closed position with the second top side wall 14 removed. FIG. 9 illustrates how the bottom side walls 92, 94 pivot on the first and second sides of the 132, 136 curved slots 124, 126 as the clamp 10 is opened and closed. The legs 166, 168 of the saddle 144 keep the lower sections 120, 122 of the bottom side walls 92, 94 aligned. The aperture 76 in the conductor plate 64 can be used to attach a cable (not shown) for tapping power from an electrical main.

Figure 10:
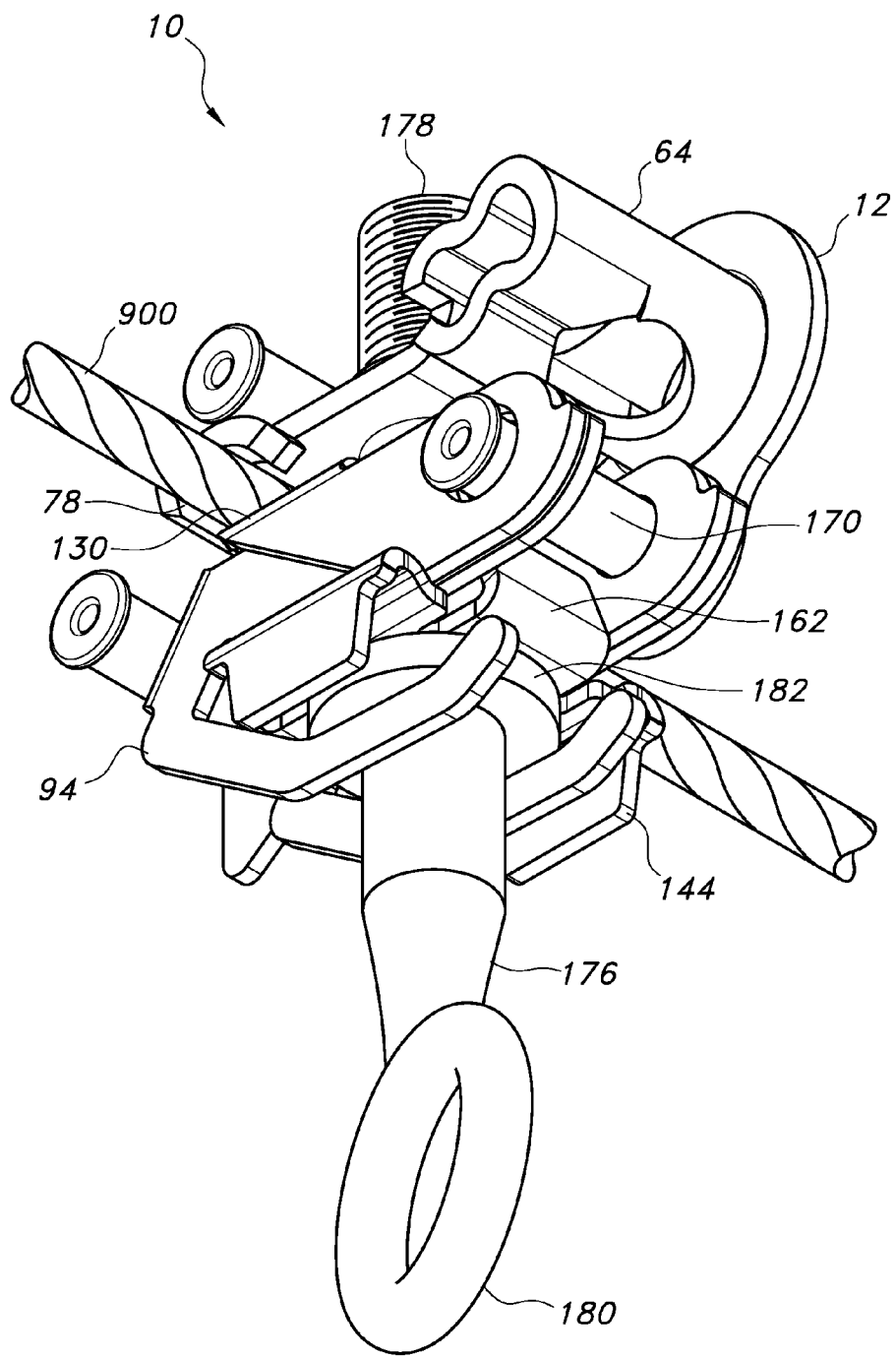
FIG. 10 is a rear-side perspective view of the stamped hotline clamp shown in FIG. 6 in the closed position with one of the top side walls removed.

FIG. 10 shows the stamped hotline clamp 10 in the closed position with the second top side wall 14 removed. The cable seat 78 and contact plate 130 electrically contact and secure the clamp 10 to an electrical power cable 900.

Figure 11:
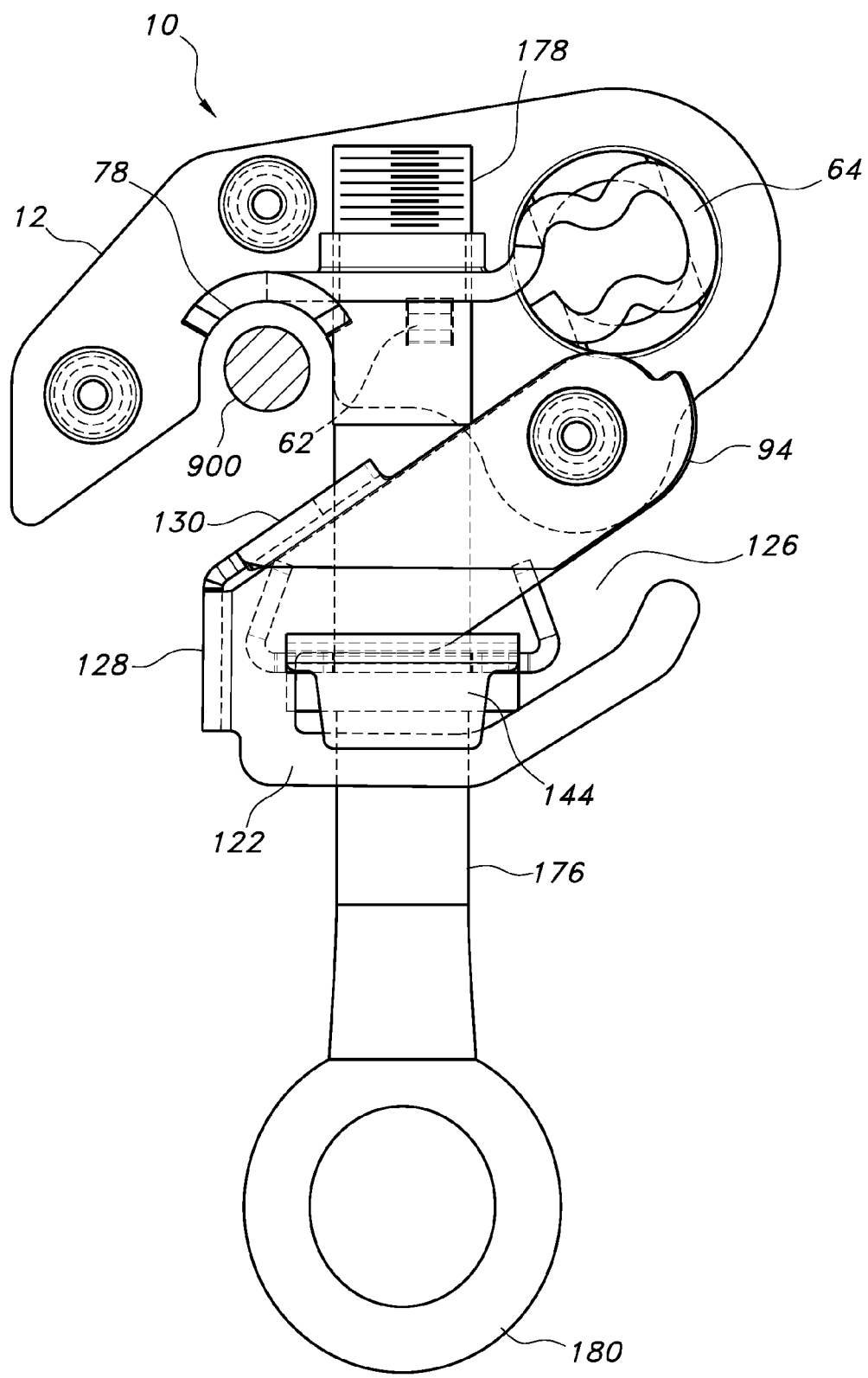
FIG. 11 is a side view of the stamped hotline clamp shown in FIG. 8 with the hidden components of the clamp shown with dashed lines.

FIG. 11 shows the stamped hotline clamp 10 in the open position with the second top side wall 14 removed. The portions of the first top side wall 12, elongated shaft 176, conductor plate 64 and saddle 144 hidden by the second bottom side wall 94 are shown with dashed lines. With the clamp 10 in an open position, an electrical power cable 900 is positioned between the cable seat 78 and the contact plate 130. The lower section 122 of the bottom side wall 94 is substantially perpendicular to the axis of the elongated shaft 176. FIG. 11. also shows the retainer 62 in the first top side wall 12 supporting the conductor plate 64.

Figure 12:
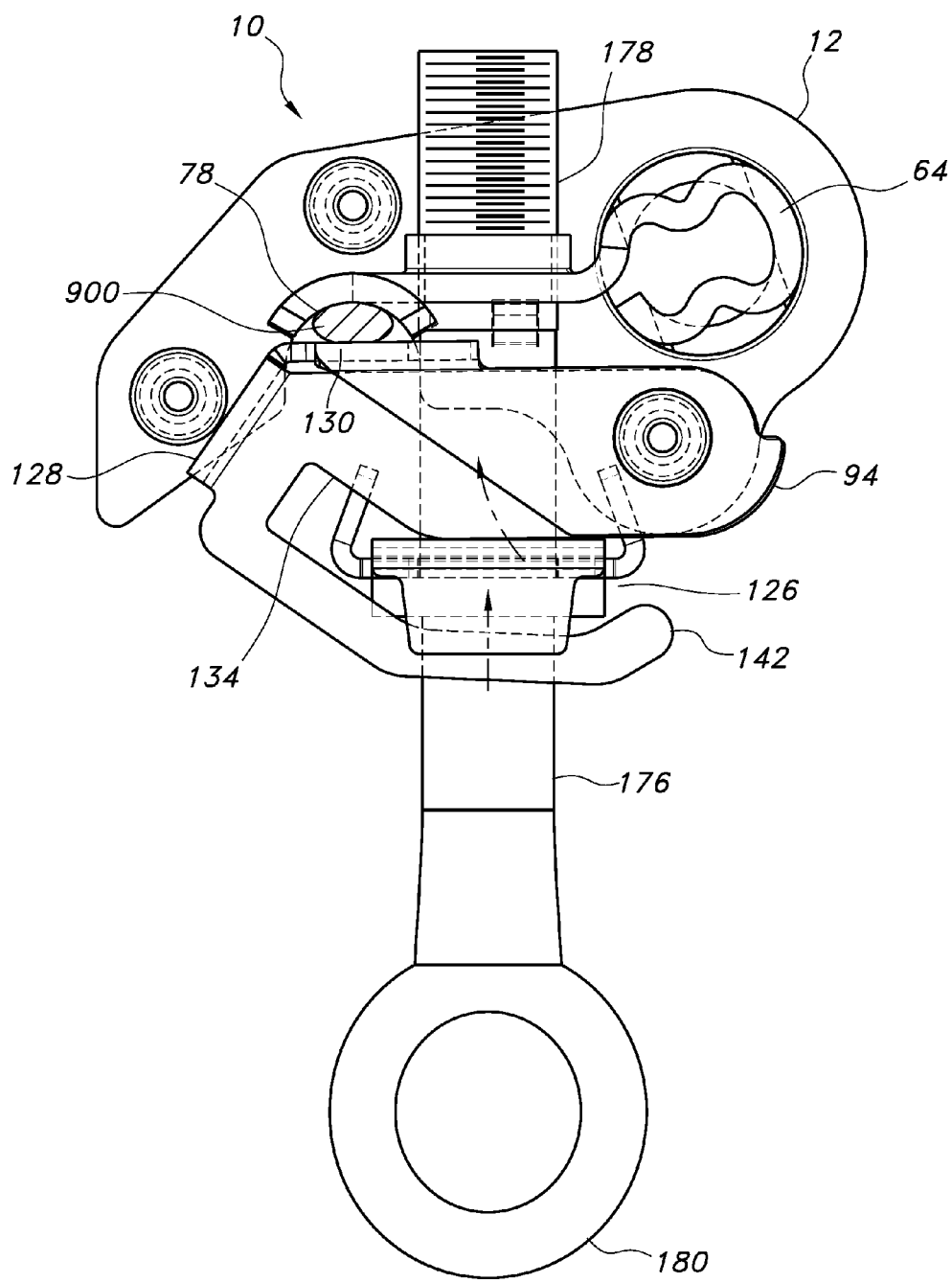
FIG. 12 is a side view of the stamped hotline clamp shown in FIG. 9 with the hidden components of the clamp shown with dashed lines.

FIG. 12 shows the stamped hotline clamp 10 in the closed position with the second top side wall 14 removed. The portions of the first top side wall 12, elongated shaft 176, conductor plate 64 and saddle 144 hidden by the second bottom side wall 94 are shown with dashed lines. With the clamp 10 in a closed position, the electrical power cable 900 is secured between the cable seat 78 and the contact plate 130. The curved portion of the first side 134 of the slot 126 pivots so that the contact plate 130 rotates upwardly and contacts the cable 900.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A stamped hotline clamp comprising:
two parallel, opposing top side walls, each top side wall comprising first and second ends, top and bottom edges and an intermediate section between the first and second ends;
two parallel, opposing bottom side walls, each bottom side wall comprising first and second ends, and top and bottom edges, wherein the first and second ends correspond to the first and second ends of the top side walls, and wherein a base plate connects the second ends of the two bottom side walls;
a contact plate on the top edges of the bottom side walls;
a conductor plate disposed between and extending parallel to the top side walls, the conductor plate comprising an intermediate section with a threaded aperture;
a hinge pivotably connecting the first ends of the top side walls and the bottom side walls;
and
an elongated shaft comprising a threaded first end, a second end and a flanged collar radially extending from the shaft at a point between the first and second ends;
wherein the first end of the shaft is inserted between the bottom side walls and threaded into the threaded aperture in the conductor plate, wherein rotating the shaft in a clockwise direction closes the clamp and rotating the shaft in a counter-clockwise direction opens the clamp.

2. The stamped hotline clamp according to claim 1, wherein each bottom side wall further comprises upper and lower sections separated by a slot.

3. The stamped hotline clamp according to claim 2 further comprising a saddle comprising a rectangular flat base having an opening, first and second ends, first and second sides and top and bottom surfaces, wherein the second end of the saddle is inserted between the bottom side walls and the first and second sides of the base slide into the slots in the two bottom side wall, and wherein the threaded first end of the elongated shaft passes through the opening in the saddle and the bottom surface of the saddle contacts the flanged collar before the threaded first end is threaded into the threaded aperture in the conductor plate.

4. The stamped hotline clamp according to claim 3, wherein the saddle further comprises first and second guide wings that extend upwardly and inwardly from the first and second ends, respectively.

5. The stamped hotline clamp according to claim 3, wherein the saddle further comprises first and second legs extending downwardly from the first and second sides, respectively.

6. The stamped hotline clamp according to claim 5, wherein, when the second end of the saddle slides into the slots in the two bottom side walls, the base extends through the slots and the two legs of the saddle extend downwardly on the outside of the bottom side walls.

7. The stamped hotline clamp according to claim 1, wherein the conductor plate further comprises a longitudinal axis extending between a cylindrical first end and a downwardly concave second end connected by the intermediate section.

8. The stamped hotline clamp according to claim 7, wherein each of the two parallel, opposing top side walls further comprising a plurality of apertures, a retainer extending towards the opposing top side wall, a length extending between the first and second ends, and a width extending between the top and bottom edges.

9. The stamped hotline clamp according to claim 8, wherein the width of the first end is greater than the width of the second end, and wherein the bottom edge of the intermediate section is concave and has a recessed portion.

10. The stamped hotline clamp according to claim 8, wherein the cylindrical first end of the conductor plate is transverse to the longitudinal axis and has first and second ends that press-fit into apertures in the top side walls.

11. The stamped hotline clamp according to claim 8, wherein the cylindrical first end of the conductor plate has an aperture between the first and second ends.

12. The stamped hotline clamp according to claim 8, wherein the downwardly concave second end of the conductor plate forms a cable seat that extends parallel to the cylindrical first end to first and second distal ends that are received by the recessed portion of each of the top side walls.

13. The stamped hotline clamp according to claim 8, wherein the intermediate section of the conductor plate is supported by the retainers on the top side walls.

14. The stamped hotline clamp according to claim 1, wherein the two parallel top side walls and the two parallel bottom side walls are substantially flat.

15. The stamped hotline clamp according to claim 1, wherein each of the two parallel, opposing bottom side walls further comprising an aperture.

16. The stamped hotline clamp according to claim 1, wherein the contact plate extends from the base plate to an intermediate point on the top edges of the bottom side walls.

17. The stamped hotline clamp according to claim 1, wherein the hinge extends through apertures in the top and bottom side walls.

18. The stamped hotline clamp according to claim 1, wherein one or more standoffs separate and connect the parallel top side walls at the second ends.

19. The stamped hotline clamp according to claim 1, wherein the second end of the elongated shaft has a ring.

20. The stamped hotline clamp according to claim 2, wherein each slot extends from the first end of the bottom side wall towards the second end and has top and bottom sides that correspond with the top and bottom edges of the bottom side walls, and wherein the slot is perpendicular to the base plate between the second end of the bottom side walls to an intermediate point and then curves upwardly between the intermediate point and the first end.

21. The stamped hotline clamp according to claim 20, wherein, when the clamp opens and closes, the top sides of the slots in the bottom side walls pivot to move the contact plate towards the conductor plate.

22. A stamped hotline clamp comprising:
two parallel, opposing top side walls, each top side wall comprising first and second ends, top and bottom edges, an intermediate section between the first and second ends, a plurality of apertures and a retainer extending towards the opposing top side wall, wherein the bottom edge of the intermediate section has a notch;
two parallel, opposing bottom side walls, each bottom side wall comprising first and second ends, top and bottom edges and upper and lower sections separated by a curved slot, wherein the first and second ends correspond to the first and second ends of the top side walls, and wherein a base plate connects the second ends of the two bottom side walls;
a contact plate on the top edges of the bottom side walls, wherein the contact plate extends from the base plate to an intermediate point on the top edges of the bottom side walls;
a conductor plate disposed between and extending parallel to the top side walls, the conductor plate comprising a longitudinal axis extending between a cylindrical first end and a downwardly concave second end and an intermediate section with a threaded aperture therebetween;
a saddle comprising a rectangular flat base having an opening, first and second ends, first and second sides, top and bottom surfaces, first and second guide wings extending upwardly from the first and second ends and first and second legs extending downwardly from the first and second sides, wherein the second end of the saddle is inserted between the bottom side walls and the first and second sides of the base slide into the slots in the two bottom side walls with the first and second legs on the outside of the bottom side walls;
a hinge pivotably connecting the first ends of the top side walls and the bottom side walls;
and
an elongated shaft comprising a threaded first end, a second end formed by a ring and a flanged collar radially extending from the shaft at a point between the first and second ends;
wherein the first end of the shaft is inserted into the opening in the saddle and the bottom surface of the saddle contacts the flanged collar, wherein the first end of the shaft is then threaded into the threaded aperture in the conductor plate, and wherein rotating the shaft in a clockwise direction closes the clamp and rotating the shaft in a counter-clockwise direction opens the clamp.

23. A stamped hotline clamp comprising:
two parallel, opposing top side walls, each top side wall having a plurality of apertures, a retainer extending towards the opposing top side wall, first and second ends that define a length, top and bottom edges that define a width and an intermediate section between the first and second ends, wherein the width of the first end is greater than the width of the second end, and wherein the bottom edge of the intermediate section is concave and has a recessed portion;
two parallel, opposing bottom side walls, each bottom side wall having an aperture, first and second ends, top and bottom edges and upper and lower sections separated by a slot, wherein the first and second ends correspond to the first and second ends of the top side walls, and wherein the first and second bottom side walls are connected by a base plate at the second end and a contact plate that extends from the base plate to an intermediate point on the top edges of the bottom side walls, wherein each slot extends from the first end of the bottom side wall towards the second end and has first and second sides that correspond with the top and bottom edges of the side walls, and wherein the slot is perpendicular to the base plate between the second end of the bottom side walls to an intermediate point and then curves upwardly between the intermediate point and the first end;
a conductor plate disposed between the top side walls and having a longitudinal axis parallel to the top side walls and extending between a cylindrical first end and a downwardly concave second end and an intermediate section between the first and second ends, wherein the cylindrical first end is transverse to the longitudinal axis and has first and second ends and an intermediate aperture, wherein the downwardly concave second end forms a cable seat, and wherein the intermediate section has a threaded aperture and side edges that contact the retainers on the top side walls;
a saddle comprising a rectangular flat base having an opening, first and second ends, first and second sides and top and bottom surfaces, wherein a guide wing extends upwardly and inwardly from each of the first and second ends and two legs extend downwardly from each of the sides, and wherein the second end of the saddle slides into the slots in the two bottom side walls with the base extending through the slots and the two legs of the saddle extending downwardly on the outside of the bottom side walls;

a hinge extending through apertures in the top and bottom side walls and pivotably connecting the first ends of the top side walls and the bottom side walls;

a standoff separating and connecting the parallel top side walls at the second ends; and an elongated shaft comprising a threaded first end, a second end and a flanged collar radially extending from the shaft at a point between the first and second ends, wherein the second end has a ring;

wherein the first end of the shaft is inserted into the opening in the saddle and the bottom surface of the saddle contacts the flanged collar, wherein the first end of the shaft is then threaded into the threaded aperture in the conductor plate, wherein rotating the shaft in a clockwise direction closes the clamp and rotating the bottom end of the shaft in a counter-clockwise direction opens the clamp, and wherein when the clamp opens and closes, the top sides of the slots in the bottom side walls pivot on the base of the saddle to move the contact plate towards the cable seat of the conductor plate.

\* \* \* \* \*